Oct. 10, 1950 N. E. SPRECHER 2,525,103

APPARATUS FOR CONTROLLING BLACK LEVEL SHIFT
IN TELEVISION SIGNALS

Filed March 11, 1948

INVENTOR
Noah E. Sprecher
BY John [illegible] Mitchell
ATTORNEY

Patented Oct. 10, 1950 2,525,103

UNITED STATES PATENT OFFICE 2,525,103

APPARATUS FOR CONTROLLING BLACK LEVEL SHIFT IN TELEVISION SIGNALS

Noah E. Sprecher, Valley Cottage, N. Y., assignor to Radio Corporation of America, a corporation of Delaware Application March 11, 1948, Serial No. 14,326

1 Claim. (Cl. 178—7.3)

My invention relates in general to circuits for controlling the operating level of electrical equipment and more particularly to circuits for controlling the black level shift in video and synchronizing signals which have been transmitted through apparatus which tend to distort the true values of such signals and hence allow such shift.

In the transmission of television signals to receiving apparatus, the signals originate at a point which usually is some distance from the transmitter per se. Events such as sporting events may be shipped from remote units to receiving apparatus which in turn may convey the signals, after appropriate amplification, to the transmitter unit itself for broadcast purposes. Again, rehearsed programs may originate in a studio which is located some distance from the transmitter, and, before the conduction of the signals from the studio to the transmitter, they must be amplified to a desired degree as well as mixed with synchronizing, blanking signals, and the like, as is well known. Regardless of their point of origin however, amplification of the signals is necessary before they modulate the carrier of the transmitter.

The amplifiers through which the signals are passed, comprise one or more stages, the input circuit to which is biased to a selected value in order to fix the operating point on the grid voltage-plate current characteristic of the tube used in each of the amplifying stages. When the synchronizing signals and blanking signals are passed to the amplifying stages, the A. C. axis of the signals will be fixed with respect to this bias value. On the other hand, when the video signals are adedd, the A. C. axis of the composite signal then will change and will tend to throw the synchronizing signals into the region of the curved portion of the tube characteristics forming the amplifier and there will be a distorted shift in the synchronizing signal with respect to the A. C. axis of the signals impressed onto the grid of the tube. Since the peak values of the synchronizing signals bear a relationship to the value of picture black in the picture which is being transmitted, it will be appreciated that any distortion introduced in the signal should be eliminated if possible. Any such shifts in the synchronizing signal level with respect to the true signal level, will result in a misrepresentation of the black level of the picture being televised and this is especially serious if the shift occurs before the transmission of the signals since normally the receiver reproduces correctly the signal received from the transmitter and therefore the signal should be as correct as possible in all respects. It is one of the objects of my invention therefore to provide an apparatus in which a shift in the true value of the signal representing the black level of a television picture is prevented.

Previously it has been attempted to compensate for a distortion of this nature by providing in the input circuit to one of the amplifiers, and which preferably is the last amplifying stage, a D. C. restorer tube associated with a condenser-grid leak combination which tended to hold the black level of the picture at a fixed value. The circuit suffered the disadvantage however, that the diode had a threshold of such a nature that low signal values would not supply proper current to the condenser and more importantly, the potential drop through the diode itself varied with signal strength and therefore allowed the peaks of the synchronizing signal to shift with respect to the grid bias on the amplifying tube with which the combination was associated, thus causing shift in the signal value representing black in the picture being televised. It is a further object of my invention therefore to provide a circuit in which this disadvantage will be overcome.

Another of the disadvantages of the previously used clamping tube arrangement has resided in the fact that the plate-cathode capacity of the diode forming the clamping tube, was shunted across the input circuit to the amplifier with which it was associated. This resulted in a loss of some high frequency components of the signal impressed on the tube. Additionally, it is an object of my invention therefore to provide an apparatus in which this disadvantage is overcome.

My invention has found particular use in apparatus for transmitting video signals a fair distance to a transmitting or receiving apparatus although the invention naturally is not limited to this use.

In a used embodiment of the invention, the invention has been applied to the last amplifying stage through which the video and synchronizing signals are passed before being impressed onto a co-axial cable for conduction to a transmitter. One advantage of applying the apparatus to the last amplifying stage is that cumulative distortions of the nature described may then be eliminated before transmission of the signals to the transmitter.

My invention in general may be said to comprise feeding back a portion of the energy in the output circuit of an amplifying tube through which it is desired to pass synchronizing signals at a fixed peak value to the input circuit of the amplifier to compensate for shift in the values of the synchronizing signal which normally would occur due to distortion introduced by the curved plate grid voltage-current characteristic of the tube as a result of the shift of the synchronizing signal with respect to the A. C. axis in the signal as it is impressed on the grid of the amplifier.

In general this is done by impressing the potential changes across at least a portion of a resistor in the output circuit of an amplifying tube on the control grid circuit thereof by means of a coupling capacitor, a rectifier, and a storage condenser, the latter having a leakage path connected in shunt therewith. A second rectifier connects the coupling capacitor to ground so that no appreciable charges can be built up on the capacitor which will affect the true operation of the device. The storage capacitor is charged in accordance with the peak value of the synchronizing signal and by using selected values of plate resistance in the output of the amplifier, the synchronizing signals can be made to increase, decrease, or not change at all with a change in amplitude of the video signal.

My invention will be understood best by referring to the figures of the drawing in which.

Figure 1:
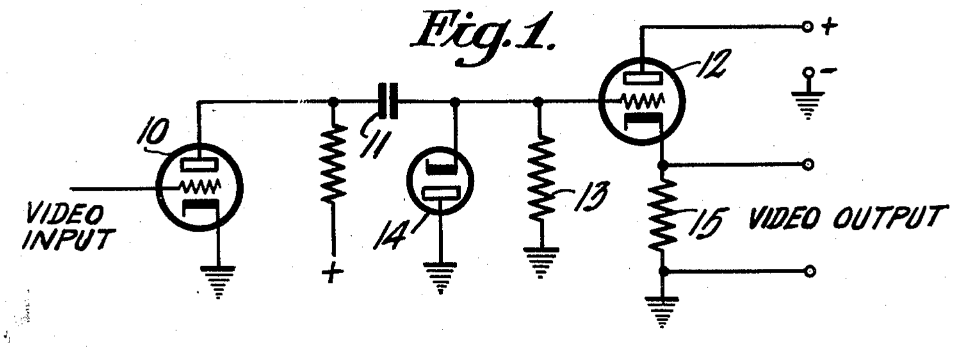
Figure 1 shows an arrangement of the prior art.

Referring to Figure 1 there is shown an arrangement which has had considerable use in the general art to which this invention pertains. In this arrangement, signals which have been amplified by tube 10 are impressed onto the control grid of an amplifying tube 12, which in actual practice would be the final amplifier, through capacitor 11. The tube 12 has input resistor 13 connected in the control grid in ground circuit thereof. Also shunted across the control grid is a diode 14. Signals appearing across the diode are rectified in accordance with the peak value of the synchronizing signals which are negative in the grid of the tube. The output of the tube may be cathode coupled to a utilizing circuit by taking signals appearing across resistor 15. This general type of arrangement is well known and a modified form thereof is shown in U. S. Patent No. 2,224,134, granted December 10, 1940 to A. D. Blumlein.

The chief disadvantage of this arrangement has been the fact that there is a potential drop across the internal resistance of the tube 14 and this drop, of course, varies with the amplitude of the signal input thereto. This then will still allow a varying low magnitude shift on the part of the picture black level due to this variable potential drop within the rectifier tube itself.

Figure 2:
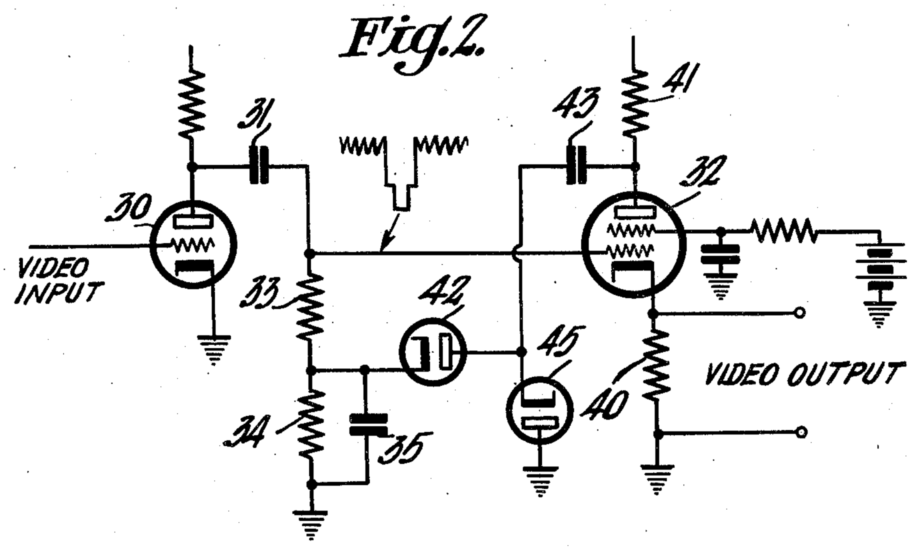
Figure 2 shows one embodiment of my invention.

Referring to Figure 2 there is shown an embodiment of my invention. Signals impressed onto the input circuit of an amplifying tube 30 are fed via a coupling condenser 31 to the grid circuit of the tube comprising the last amplifying stage of the signals before their utilization by apparatus such as transmission apparatus and which must have the level of the synchronizing signals accurately represented. Connected in the grid-ground circuit of the tube 32 are serially connected resistors 33 and 34. The latter resistor has a condenser 35 shunted across it.

Output from tube 32 is taken from the signal variations across cathode resistor 40 which is connected between the cathode of the tube and ground. Additionally, the tube 32 has a plate resistor 41 connected in the plate circuit thereof.

The common terminal of the resistor-condenser combination 34, 35 is connected to the cathode of a first diode 42, whose plate is connected through condenser 43 to the common terminal of the plate of tube 32 and plate resistance 41. Additionally, the common terminal of diode 42 and condenser 43 is connected to the cathode of a diode 45 whose plate is grounded. The operation of the device is as follows.

The composite signal consisting of the line by line video signals and the blanking signal and the synchronizing signal are impressed onto the control grid of tube 32 in a negative sense, that is to say that the lighter portions of the object being scanned are represented by an increase in the amplitude of the video signal, and both the blanking signal and the synchronizing signal increase in a negative direction. This means then that when the composite signal is impressed onto the grid of 32, the potential of the common terminal of the plate of the tube and plate resistor 41 will increase when the blanking and synchronizing signals are impressed onto the tube. This will cause a positive pulse to be impressed onto the plate of diode 42 which will draw current and will charge condenser 35 to a value which is dependent on the peak voltage of the positive pulse. Since the peak voltage is dependent on the value of the synchronizing and video (picture) signal, the positive pulse so produced and, hence the charge on condenser 35, also will be proportional in the value of synchronizing and blanking and picture signals. With this arrangement 35 can charge to a value which is proportional to the peak signal voltage. The charge on condenser 35 affects the bias on the control grid of tube 32. If the bias change developed across resistor 34 and condenser 35 is equal to the A. C. axis shift with respect to the synchronizing signal value, when the video signals are added thereto and which otherwise would be distorted by tube 32, there then will be no black level shift in the composite video signal, in the output of the amplifying tube.

In order to keep condenser 43 discharged so that no voltage will be developed at the common terminal of the condenser and diode 42, the second diode 45 is provided which has the cathode thereof connected to the common terminal between the plate of diode 42 and condenser 43. With this arrangement no appreciable charge can build up on the condenser 43 which would tend to bias diode 42 to a cut-off value which would interfere with its operation in the circuit. Any negative potential appearing at the common terminal of diode 42 and condenser 43 will lower the potential to the cathode of diode 45 relatively to the plate thereof, which is grounded, and charges which otherwise might accumulate on condenser 43 will be discharged through diode 45.

The addition of the output resistor 41 has very little effect on the output voltage as taken across resistor 40 since tube 32 may be a pentode type of tube and the addition of resistor 41 will not appreciably affect the output thereof.

It will be appreciated that the signal could be impressed onto the grid of tube 32 with the synchronizing signal increasing in the positive direction rather than as has been illustrated in the drawing and under these circumstances the diodes 42 and 45 would have to have the connections thereto appropriately reversed.

Figure 3:
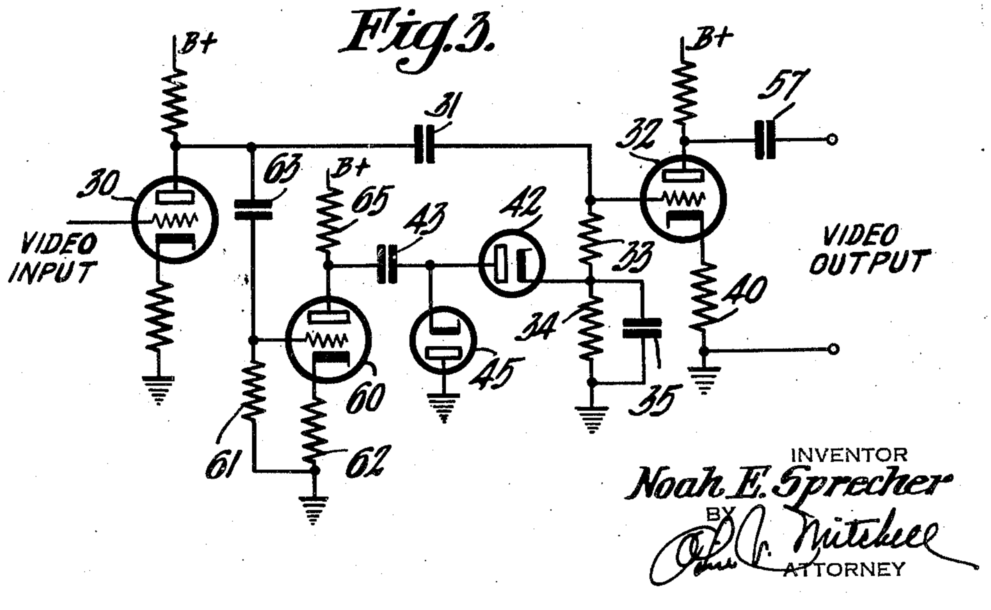
Figure 3 shows an alternative form of my invention.

Referring to Figure 3 there is shown an alternative form of my invention. In the arrangement of this figure, signals from the output circuit of the amplifying tube 30 are coupled to the input circuit of amplifier tube 32 through condenser 31. The grid of tube 32 is grounded through resistors 33 and 34, the latter having condenser 35 shunted thereacross. The cathode of tube 32 is grounded through resistor 40 and the output is taken from the plate-ground circuit through condenser 57.

In this form of the invention a separate amplifier tube is used to develop the voltage which controls the operating level of tube 32. The separate amplifying tube is tube 60 which has the control grid thereof grounded through resistor 61 and the cathode thereof grounded through resistor 62.

Signals from the output circuit of the tube 30 also are impressed onto the control grid of tube 60 through coupling condenser 63, the latter being serially connected with resistor 61.

The potential changes occurring across resistor 65, which is connected in the plate-ground circuit of amplifier tube 60, are impressed onto the anode of diode 42 through coupling condenser 43. The common terminal of the anode of the diode 42 and the condenser 43 is connected to the cathode of diode 45 whose anode is grounded. The operation of the circuit is as follows.

A portion of the output of tube 30 will be amplified by tube 60 and across the resistor 65 in the output circuit thereof there will occur potential changes which are dependent on the peak amplitude of the synchronizing signal and on the amplitude of the video signal. These potential changes are impressed onto the anode of diode 42, which will store energy in condenser 35 in a manner similar to that described with respect to the circuit of Figure 2, and the potential developed across condenser 35 will be dependent on the rectified energy. The potential of condenser 35 will determine the bias on the grid of tube 32 and thus control its operating level and thus control the black level shift in the signals impressed onto the amplifier.

Diode 45 has a function in this circuit which is similar to its function described with respect to Figure 2.

In Figure 3, circuit elements which play the same part in the operation of the apparatus as similar elements in Figure 2 have been given similar reference numerals.

Having now described my invention what is claimed is:

Apparatus for controlling the black level shift in a television signal in which the synchronizing signal portion thereof recurrently reaches a datum level and in which the datum level bears a selected relationship to picture black level comprising means for providing a source of composite video, black level and sync signals with the sync signal portion thereof extending in a negative polarity direction, a thermionic tube having an anode, a control electrode and a cathode, means including a condenser to apply the composite signals to the control electrode of said tube, means to connect the cathode of said tube to a point of fixed potential, means including an impedance element to maintain the anode at a positive potential with respect to the cathode of said tube, a pair of resistance elements connected in series between the control electrode and the point of fixed potential, a condenser connected in parallel with the one of the series resistances next adjacent the point of fixed potential, a pair of diodes each including an anode and a cathode, means to connect the anode of one diode to the point of fixed potential, means including a condenser to connect the cathode of said one diode to the anode of said tube, means to connect the anode of the other diode to the cathode of said one diode, and means to connect the cathode of said other diode to the junction of said pair of resistance elements.

NOAH E. SPRECHER.

REFERENCES CITED

The following references are of record in the file of this patent:

UNITED STATES PATENTS

| Number | Name | Date |
|---|---|---|
| 2,203,634 | Richards | June 4, 1940 |
| 2,240,600 | Applegarth | May 6, 1941 |
| 2,240,601 | Applegarth | May 6, 1941 |
| 2,254,114 | Wilson | Aug. 26, 1941 |
| 2,254,204 | Blumlein | Sept. 2, 1941 |
| 2,288,434 | Bradley | June 30, 1942 |
| 2,295,410 | Kreuzer | Sept. 8, 1942 |
| 2,307,387 | Blumlein | Jan. 5, 1943 |

FOREIGN PATENTS

| Number | Country | Date |
|---|---|---|
| 845,897 | France | Sept. 4, 1939 |
| 847,676 | France | Oct. 13, 1939 |